United States Patent [19]
Voggenreiter et al.

[11] Patent Number: 6,019,118
[45] Date of Patent: Feb. 1, 2000

[54] CRYOGENIC VALVE

[75] Inventors: Heinz Voggenreiter, München; Albert Seidel, Höhenkirchen-Siegertsbrunn, both of Germany

[73] Assignee: DaimlerChrysler AG, München, Germany

[21] Appl. No.: 09/023,760

[22] Filed: Feb. 13, 1998

[30] Foreign Application Priority Data

Feb. 15, 1997 [DE] Germany .......................... 197 05 850

[51] Int. Cl.⁷ .................................................. F16K 51/02
[52] U.S. Cl. ............................................. 137/15; 251/368
[58] Field of Search .................. 251/368; 29/888.44; 123/188.3; 137/15

[56] References Cited

U.S. PATENT DOCUMENTS

| | | | |
|---|---|---|---|
| 4,136,854 | 1/1979 | Ehmig et al. ............................ | 251/333 |
| 4,546,737 | 10/1985 | Kazuoka et al. ........................ | 123/188 |
| 4,741,080 | 5/1988 | Larson et al. .......................... | 29/156.7 |
| 5,169,460 | 12/1992 | Mae ........................................ | 148/421 |
| 5,662,745 | 9/1997 | Takayama et al. ...................... | 148/237 |

*Primary Examiner*—A. Michael Chambers
*Attorney, Agent, or Firm*—McGlew and Tuttle, P.C.

[57] ABSTRACT

Cryogenic valve with at least one pair of sealing elements, preferably one with a seat and a tappet, whose seat surfaces are in sealing contact with one another in the shutoff position. At least one sealing element of the pair is formed of a linearly superelastic shape memory alloy, which is stabilized by plastic cold working in the martensitic textural state, i.e., no longer displays a shape memory effect.

9 Claims, 1 Drawing Sheet

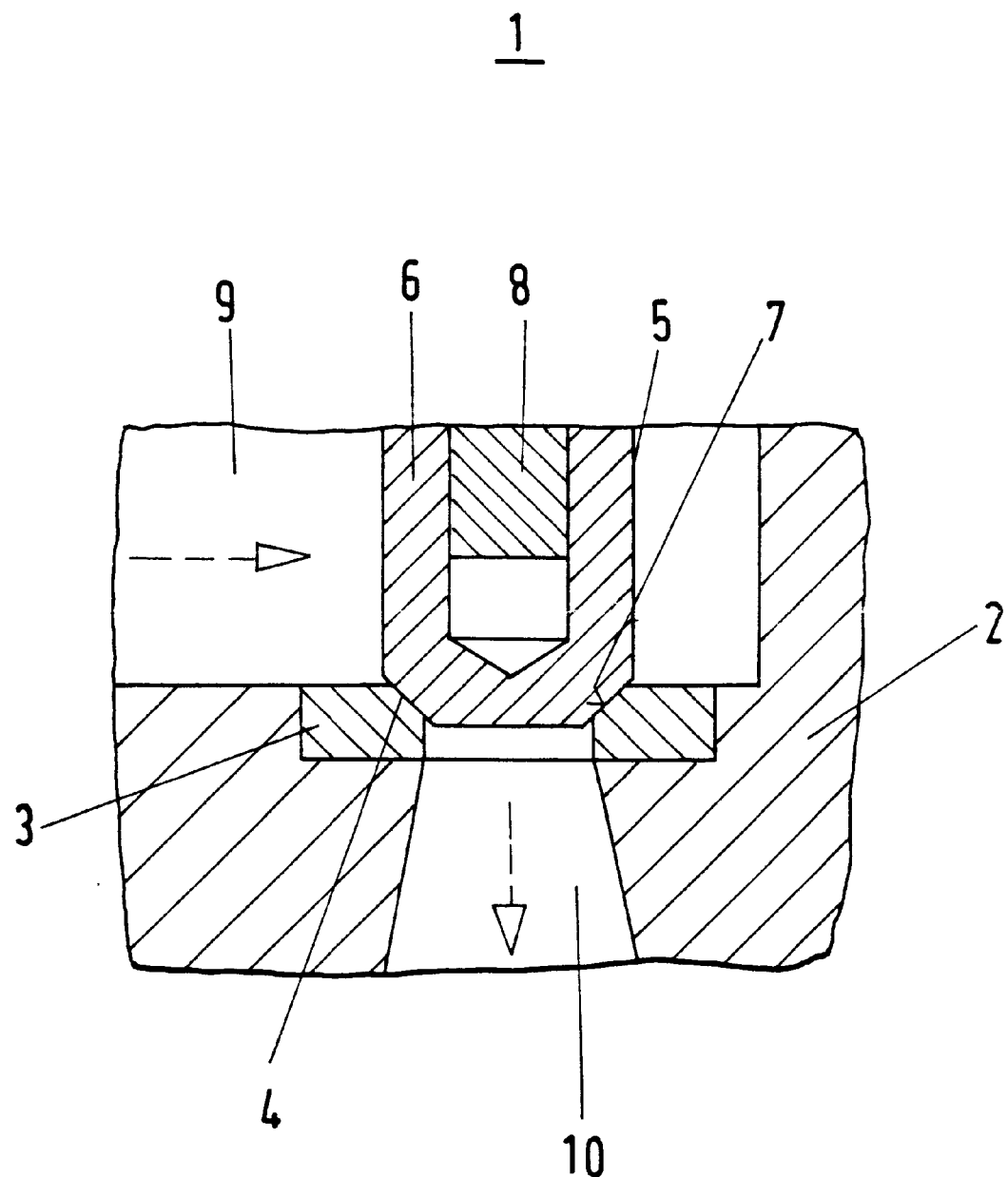

CRYOGENIC VALVE

FIELD OF THE INVENTION

The present invention pertains to a cryogenic valve with at least one pair of sealing elements, preferably a pair comprising a seat and a tappet, whose seat surfaces are in sealing contact with one another in the shutoff position.

BACKGROUND OF THE INVENTION

A cryogenic valve with shutoff and control function has been known from, e.g., DE-OS 28 27 527.

Valves for cryogenic, i.e., extremely low-temperature media, e.g., $LN_2$, $LH_2$, and LHe, have generally the problem that all the seat and tappet materials are very hard at the operating temperatures of 2 K to 80 K occurring in these cases. This is equally true of metallic and nonmetallic materials. The elasticity of nonmetallic materials (e.g., Vespel), which is present at room temperature, will then disappear almost completely. This behavior makes it especially difficult to meet stringent requirements imposed in terms of tightness, which can be met, if at all, only with great design effort and development-technical efforts.

One principal problem is caused by abrasion and other particles between the sealing surfaces. However, machining-related deviations from the desired geometry are also hardly able to be compensated in the absence of elasticity.

SUMMARY AND OBJECTS OF THE INVENTION

In light of these problems, the object of the present invention is to provide a cryogenic valve with shutoff function, i.e., with at least one pair of sealing elements, which is characterized by an especially high leak tightness even at extremely low temperatures and can be manufactured with the usual design and manufacturing technical effort.

According to the invention, a cryogenic valve with at least one pair of sealing elements, preferably a pair comprising a seat and a tappet, whose seat surfaces are in sealing contact with one another in the shutoff position. At least one sealing element (either the seat or the tappet) of the pair consist of a linearly superelastic (LSE) shape memory alloy, which is stabilized by plastic cold working in the martensitic textural state, i.e., it no longer displays a temperature-dependent structural transformation into austenite (no shape memory effect).

The solution according to the present invention consists of using at least one sealing element made of a linearly superelastic material in each pair of sealing elements. These LSE materials are plastically cold-worked shape memory alloys, which still have a high linear elasticity of up to and exceeding 4%, i.e., a high elastic deformability, even at very low temperatures. The seat surfaces (sealing surfaces) are thus able to compensate surface roughnesses caused by machining, wear and contamination. Due to the relatively high cold working, these materials are deprived of the shape memory effect, i.e., these materials are deprived of the temperature dependent transformation from martensite to austenite and vise versa, so that they behave like "normal," but just especially elastic metal alloys.

A preferred embodiment of the cryogenic valve according to the invention provides at least one linearly superelastic shape memory alloy based on NiTi or Cu with a degree of cold working of 10% to 30%.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWING

In the drawing:

The only FIGURE is a sectional view showing a simplified, non-true-to-scale representation of a seat area of a cryogenic valve.

DESCRIPTION OF THE PREFERRED EMBODIMENTS

Referring to the drawings in particular, the invention comprises a cryogenic valve 1 which is used for controlling a flow of a cryogenic medium, e.g., LHe. With the cryogenic valve 1, such a flow is shut off, very extensively free from leakage, and released if desired, and the flow rate is optionally regulated or controlled.

The functional elements proper are the seat 3 firmly integrated in the housing 2 and the tappet 5, which is movable axially, i.e., vertically in this case, and comprises a core 8 and a jacket 6 firmly connected to same. The seat 3 and the tappet 5 have a finely machined, conical seat surface 4 and 7, respectively, which ensure excellent sealing without any additional sealing elements or coatings.

The seat surfaces could, of course, also have a different shape, e.g., they could be conical, flat, bent, stepped, etc., but a two-dimensional contact should always be present in the shutoff position.

The FIGURE shows this shutoff position only, and the direction of flow after release in the feed channel 9 and the discharge channel 10 are indicated by arrows drawn in broken lines.

An important aspect of the invention is the use and selection of the material of the sealing elements rather than the particular arrangement as such. Either the seat 3, including its seat surface 4, or the jacket 6 of the tappet 5, including its seat surface 7, or both elements 3 and 6 consist of a linearly superelastic material, i.e., a cold-worked and thus texture-stabilized shape memory alloy. Nickel-titanium and copper-based alloys having the desired low-temperature elasticity have been currently known. It is possible that other LSE materials will also be found in the near future which will similarly be useful for practicing the invention.

A linear elastic deformation of up to 4.5% in the temperature range of about −150° C. to +150° C. is displayed especially by the NiTi-based alloys.

The required cold working of the LSE materials (which are themselves known) is about 10% to 30% and is performed by, e.g., forging, rolling, drawing, etc., and the numerical values indicate the residual plastic deformation. The effect of cold working proper consists of generating defects in the martensitic crystal lattice of the alloy, which defects permanently prevent a "transformation" to the austenitic lattice structure and facilitate the elastic deformation of the lattice.

If both sealing elements of a pair consist of LSE material, it may be meaningful to pair alloys based on different metals in order to avoid "seizing phenomena."

While specific embodiments of the invention have been shown and described in detail to illustrate the application of the principles of the invention, it will be understood that the invention may be embodied otherwise without departing from such principles.

What is claimed is:

1. A cryogenic valve, comprising:

at least one pair of sealing elements whose seat surfaces are in sealing contact with one another in the shutoff position, at least one of said sealing elements of the pair consist of a linearly superelastic shape memory alloy, which is stabilized by plastic cold working in the martensitic textural state, and no longer displays a temperature-dependent structural transformation into austenite and therefor has no shape memory effect.

2. The cryogenic valve in accordance with claim 1, wherein said at least one linearly superelastic shape memory alloy includes a component selected from a group consisting of NiTi and Cu, said alloy has a degree of cold working of 10% to 30%.

3. The cryogenic valve in accordance with claim 1, wherein:

said linearly superelastic shape memory alloy includes Cu.

4. A cryogenic valve, comprising:

at least one pair of sealing elements including a seat and a tappet, whose seat surfaces are in sealing contact with one another in the shutoff position, at least one of said sealing elements of the pair consist of a linearly superelastic shape memory alloy, which is stabilized by plastic cold working in the martensitic textural state, and no longer displays a temperature-dependent structural transformation into austenite and therefor has no shape memory effect.

5. The cryogenic valve in accordance with claim 4, wherein said at least one linearly superelastic shape memory alloy includes a component selected from a group consisting of NiTi and Cu, said alloy has a degree of cold working of 10% to 30%.

6. The cryogenic valve in accordance with claim 4, wherein:

said linearly superelastic shape memory alloy includes Cu.

7. A method of forming a cryogenic valve, comprising the steps of:

providing an amount of a linearly superelastic shape memory alloy;

stabilizing the linearly superelastic shape memory alloy by plastic cold working in the martensitic textural state such that the linearly superelastic shape memory alloy no longer displays a temperature-dependent structural transformation into austenite and therefor has no shape memory effect;

providing at least one pair of sealing elements whose seat surfaces are in sealing contact with one another in the shutoff position, wherein at least one of said sealing elements of the pair consists of the stabilized linearly superelastic shape memory alloy.

8. The method of claim 7, wherein said at least one linearly superelastic shape memory alloy includes a component selected from a group consisting of NiTi and Cu, said alloy has a degree of cold working of 10% to 30%.

9. The method of claim 7, wherein:

said linearly superelastic shape memory alloy includes Cu.

* * * * *